UNITED STATES PATENT OFFICE.

DANA BICKFORD, OF WEST MEDFORD, MASSACHUSETTS.

VEGETABLE PULP OR COMPOUND.

SPECIFICATION forming part of Letters Patent No. 752,022, dated February 16, 1904.

Application filed November 9, 1903. Serial No. 180,489. (No specimens.)

*To all whom it may concern:*

Be it known that I, DANA BICKFORD, a citizen of the United States, and a resident of West Medford, county of Middlesex, and State of Massachusetts, have invented a new and useful fibrous pulp or compound made from waste vegetable matter—such as leaves, tops of vegetables, cornstalks, weeds, mosses, and all other waste vegetable matter such as grows in all parts of the world and is left to decay or burned for the purpose of getting rid of it—of which the following is a specification.

By an inexpensive manipulation I form a substitute from this material for fibrous pulps or compounds heretofore used. In softening and bringing these materials into shape for kneading, mixing, &c., I do not depend only upon the action of the air and moisture or other softening methods, but in case there shall still be portions of these materials remaining hard and unyielding I force them through rollers under pressure. Sometimes the waste vegetable matter spoken of may be allowed to lie for a sufficient time for the material to become soft and pliable, and in some cases portions of it may become completely or partially rotted. It may then be taken from its bed, allowed to drip or partially dry, then passed between rollers under pressure. This will crush any hard knots or other hard pieces and expel any particles or globules of water or air that have been held attached to the stalks or larger parts of such vegetable matter. After this I may subject the crushed fibers to an action which I term "kneading" and which is referred to above. This action consists in thoroughly mixing or intermingling the fibers by an action similar to that employed by a housewife in kneading dough— that is, I gently but firmly turn the layers of material over and over and change thereby the direction of the fibers repeatedly. This must be done thoroughly, and yet with no violence, the object being to prevent the fibers from being torn or broken, and yet to make the product homogeneous. If this does not complete the operation and bring the whole mass into condition to be shaped and molded, I subject it to rapidly-running brushes made of wire or other substances. This brings the whole mass to a fine homogeneous condition to be molded, shaped, or formed, as desired; but as this material in drying is apt to largely shrink or contract and draw itself out of its wanted shape I combine therewith any substance that will expand in drying and hold this material in shape. These substances depend greatly upon the use the material is to be put to. If for building purposes, such as covering the walls either inside or out or for ceilings or roofing, I apply plaster-of-paris, wood-ashes, and even common plaster mortar can be used to advantage if time is given after the lime or cement has been added to the sand for the burning properties to have expended themselves. For stucco-work, ornamental figures, plaques, medallions, picture-frames, &c., I mix plaster, clay, magnesia, or other similar substances. Buildings made in this way are warm in winter, cool in summer, and no vermin, disease, or moisture can collect in such walls, especially where moss alone is used or largely combined with other vegetable matter. Such buildings can be made as plain or ornamental as desired. Taking all in all, buildings made in this manner would be found more desirable, as they can be made to resemble stone of any kind at a much lower cost and saving of time and further repairs.

I am aware that even wood-pulp would be considered vegetable matter and that fibers and even pulps have been made from some kinds of vegetable growth; but these things I do not claim; but What I do claim, and wish to secure by Letters Patent, is—

1. The process of producing a fibrous pulp or compound from waste vegetable material which consists in crushing such material, under pressure sufficient to crush or break down any stems, knots or other hard pieces therein and to squeeze out any particles of air or water adhering to the fiber, then kneading the resultant product, substantially as described.

2. The process of producing a fibrous pulp or compound from waste vegetable material which consists in crushing such material, under pressure sufficient to crush or break down any stems, knots or other hard pieces therein and to squeeze out any particles of air or water adhering to the fiber, then kneading the resultant product and finally molding the pulp or compound under pressure, substantially as described.

3. The process of producing a fibrous pulp or compound from waste vegetable material which consists in partially or completely rotting such material, then crushing such material, under pressure sufficient to crush or break down any stems, knots or other hard pieces therein and to squeeze out any particles of air or water adhering to the fiber, then kneading the resultant product, substantially as described.

4. The process of producing a fibrous pulp or compound from waste vegetable material which consists in partially or completely rotting such material, then crushing such material, under pressure sufficient to crush or break down any stems, knots or other hard pieces therein and to squeeze out any particles of air or water adhering to the fiber, then kneading the resultant product, and finally molding the pulp or compound under pressure, substantially as described.

5. The material which consists of vegetable fiber, crushed and kneaded but not torn or broken, substantially as described.

In testimony whereof I have signed my name to this specification in the presence of two subscribing witnesses.

DANA BICKFORD.

Witnesses:
 CHAS. H. WOODMAN,
 JOHN L. HOWARD.